(12) United States Patent
Mashita

(10) Patent No.: US 7,562,597 B2
(45) Date of Patent: Jul. 21, 2009

(54) ENGINE FOR MOTORCYCLE

(75) Inventor: Daijiro Mashita, Hamamatsu (JP)

(73) Assignee: Suzuki Kabushiki Kaisha, Hamamatsu-shi (JP)

( * ) Notice: Subject to any disclaimer, the term of this patent is extended or adjusted under 35 U.S.C. 154(b) by 387 days.

(21) Appl. No.: 11/522,334

(22) Filed: Sep. 18, 2006

(65) Prior Publication Data

US 2007/0062319 A1 Mar. 22, 2007

(30) Foreign Application Priority Data

Sep. 22, 2005 (JP) ............................. 2005-275587

(51) Int. Cl.
*F16H 3/08* (2006.01)
(52) U.S. Cl. ............................. 74/331; 74/329; 74/333
(58) Field of Classification Search ................... 74/329, 74/331, 333, 335, 337.5, 606 R; 123/195 R, 123/195 C, 195 H, 195 AC, 197.5

See application file for complete search history.

(56) References Cited

U.S. PATENT DOCUMENTS 7,305,961 B2 * 12/2007 Laimbock ............... 123/195 R 7,357,047 B2 * 4/2008 Hori ............................. 74/329

FOREIGN PATENT DOCUMENTS

JP 2005016511 A * 1/2005

* cited by examiner

*Primary Examiner*—David D. Le
(74) *Attorney, Agent, or Firm*—Oblon, Spivak, McClelland, Maier & Neustadt, P.C.

(57) ABSTRACT

An engine for a motorcycle includes an engine case, a crankshaft rotatably supported within the engine case and extending laterally, an intermediate shaft being substantially parallel to the crankshaft and being rotated by the crankshaft at the same speed via a primary drive gear and a primary driven gear, a transmission input shaft being substantially parallel to the intermediate shaft and being rotated by the intermediate shaft at reduced speed via a secondary drive gear and a secondary driven gear, a transmission output shaft being substantially parallel to the transmission input shaft and being rotated by the transmission input shaft at changed speed via any combination of a plurality of transmission drive gears and transmission driven gears, and a clutch unit disposed on the intermediate shaft and capable of transmitting and interrupting rotation of the intermediate shaft to the transmission input shaft.

7 Claims, 3 Drawing Sheets

ENGINE FOR MOTORCYCLE

BACKGROUND OF THE INVENTION

1. Field of the Invention

The present invention relates to an engine for a motorcycle having an improved arrangement of a rotating shaft, a clutch unit, gears, and other units in an engine case.

2. Related Art

Conventional examples are disclosed in Japanese Unexamined Patent Application Publication No. 4-282054 (patent publication 1) and No. 2005-016511 (patent publication 2).

An engine described in the patent publication 1 includes a transmission input shaft (counter shaft) and a transmission output shaft (drive shaft) which are disposed in parallel to each other and rotatably supported behind a crankshaft. The crankshaft is rotatably supported in a front portion in an engine case and extends laterally. The engine also includes a clutch unit disposed on a right end of the transmission input shaft. A small-diameter primary drive gear disposed on the crankshaft meshes with a large-diameter primary driven gear disposed on the clutch unit. The rotation of the crankshaft is transmitted to the clutch unit at reduced speed and, via the clutch unit, transmitted to the transmission input shaft and the transmission output shaft.

The rotation of the transmission output shaft is transmitted to a longitudinally extending final output shaft via a bevel gear mechanism and is then transmitted to a rear wheel by means of drive shaft connected to the rear portion of the final output shaft. The bevel gear mechanism and the final output shaft are incorporated in a bevel gear housing disposed on a left side of the engine case.

The transmission input shaft has a hollow structure in which a clutch release rod is inserted. A clutch release mechanism mounted on an extension of a left end of the transmission input shaft serves to connect and disconnect the clutch unit through the clutch release rod. The clutch release mechanism is mounted on the bevel gear housing. The clutch release rod passes through the bevel gear housing.

An engine described in patent publication 2 has a structure in which a balancer shaft, a transmission input shaft, and a transmission output shaft are rotatably supported in parallel behind a crankshaft. The rotation of the crankshaft is transmitted to the balance shaft at the same speed, the rotation of the balancer shaft is transmitted to a clutch unit disposed on the transmission input shaft at a reduced speed, and the rotation of the clutch unit is transmitted to the transmission input shaft and the transmission output shaft.

However, for the engine described in patent publication 1, since the rotation of the crankshaft is transmitted to the clutch unit at the reduced speed, a shaft torque acting on the clutch unit becomes large. This results in the increasing of the capacity (dimensions) of the clutch unit, thus causing a problem in which the clutch actuation force is inevitably large and the size of the engine case is increased.

In addition, since the clutch unit is disposed on the right end of the transmission input shaft in this engine, both the primary driven gear disposed on the clutch unit and the primary drive gear meshing with the primary driven gear are situated in the rightmost side in the engine case, and therefore, only a clutch cover on the right side of the engine case is present between both gears and the outside thereof. As a result, noise caused by the engagement of the primary driven gear and the primary drive gear is propagated to the outside, and quietness of the engine is hence degraded.

Moreover, since the clutch unit is mounted on one end of the transmission input shaft, the clutch release mechanism on the other end of the transmission input shaft interferes with the bevel gear housing positioned behind the clutch release mechanism. Therefore, the clutch release mechanism is required to be set outside the bevel gear housing. This causes a problem in which the size of the engine case is increased laterally.

For the engine described in patent publication 2, although the rotation of the crankshaft is transmitted to the balancer shaft at the same speed, the rotation of the balancer shaft is transmitted to the clutch unit at the reduced speed. Therefore, the rotation torque acting on the clutch unit becomes large, which requires an increase in the capacity of the clutch unit. The clutch actuation force and the size of the engine case are inevitably increased.

SUMMARY OF THE INVENTION

The present invention was conceived in consideration of the circumstances mentioned above, and it is an object of the present invention to provide an engine for a motorcycle capable of reducing the capacity of a clutch unit to thereby reduce the clutch actuation force and, at the same time, also capable of miniaturizing an engine case and reducing noise caused by engagement of gears to thereby improve quietness of the engine, and provide substantially even lateral weight distribution of the engine.

The above and other objects can be achieved according to the present invention by providing, in one aspect, an engine for a motorcycle, comprising:

an engine case;

a crankshaft rotatably supported in the engine case and extending in a width direction therein;

an intermediate shaft disposed in substantially parallel to the crankshaft so as to be rotated by the crankshaft at a same speed as that of the crankshaft via a primary drive gear and a primary driven gear;

a transmission input shaft disposed in substantially parallel to the intermediate shaft so as to be rotated by the intermediate shaft at a reduced speed via a secondary drive gear and a secondary driven gear;

a transmission output shaft disposed in substantially parallel to the transmission input shaft so as to be rotated by the transmission input shaft at a changed speed via any combination of a plurality of transmission drive gears and transmission driven gears; and a clutch unit mounted on the intermediate shaft for transmitting and interrupting rotation of the intermediate shaft to the transmission input shaft.

In a preferred embodiment of the above aspect, the intermediate shaft may have one end portion protruding outward through a sidewall of the engine case, the clutch unit may be disposed on the protruding end of the intermediate shaft, the secondary drive gear may be mounted on the intermediate shaft between the clutch unit and the sidewall of the engine case, the primary driven gear may be positioned so as to oppose to the secondary drive gear with the side wall of the engine case disposed therebetween, and the primary driven gear may be meshed with the primary drive gear on the crankshaft.

The primary driven gear may be a scissors gear.

The motorcycle engine may further include a bevel gear housing disposed on a side of the engine case opposite to a side adjacent to the clutch unit, wherein a longitudinally extending final output shaft is incorporated in the bevel gear housing so as to be rotatably supported therein, and a drive bevel gear mounted on an end portion of the transmission output shaft is meshed with a driven bevel gear mounted on the final output shaft inside the bevel gear housing.

The motorcycle engine may further include a clutch release mechanism mounted on the intermediate shaft remote from the clutch unit, a flywheel magneto mounted on an end portion of the crankshaft opposite to a side adjacent to the clutch unit, and a damper mechanism mounted on the final output shaft and in front of the driven bevel gear, wherein the flywheel magneto is covered with a magneto cover, the damper mechanism is covered with the bevel gear housing, and the clutch release mechanism is disposed between the magneto cover and the bevel gear housing.

The intermediate shaft may have a hollow structure in which a clutch release rod for the clutch release mechanism is inserted.

The motorcycle engine may further include a balancer weight for damping engine vibration mounted on the intermediate shaft so as to be rotated integrally with the intermediate shaft.

It may be further desirable that the engine case has a structure dividable into upper and lower sections, and four shafts of the crankshaft, the intermediate shaft, the transmission input shaft, and the transmission output shaft are rotatably supported at a mating surface of the engine case so that the four shafts are aligned on a straight line as seen in a side view of the motorcycle.

According to the engine for a motorcycle according to the present invention of the structure mentioned above, the rotation of the crankshaft is transmitted to the clutch unit at the same speed as that of the crankshaft, so that the shaft torque acting on the clutch unit can be significantly reduced in comparison with a conventional transmission of the rotation of the crankshaft to the clutch unit at reduced speed. This allows a reduction in the capacity of the clutch unit (size reduction) and thus allows a reduction in the clutch actuation force and miniaturization of the engine case.

Since the transmission input shaft is rotated by the intermediate shaft at a reduced speed, the gear ratio between the transmission input shaft and the transmission output shaft can be reduced, and the distance between the transmission input shaft and the transmission output shaft can be reduced. This can contribute to the miniaturization of the engine case.

The primary drive gear and the primary driven gear are disposed inside the sidewall of the engine case, and a scissors gear is used as the primary driven gear. Therefore, noise caused by the engagement of the primary drive gear and the primary driven gear can be significantly reduced, providing improved quietness of the engine.

Furthermore, since the bevel gear housing is disposed opposite to the clutch unit, the distances between the rotating shafts within the engine case can be reduced, and the engine case can be hence miniaturized. At the same time, the bevel gear housing and the clutch unit, both being heavy, can be arranged so as to be divided in both sides in the engine case, thus allowing substantially even lateral weight distribution of the engine.

Further, the bevel gear housing is disposed behind the intermediate shaft, and the clutch release mechanism is disposed on the intermediate shaft so as to be remote from the clutch unit and in front of the bevel gear housing. Therefore, interference between the bevel gear housing and the clutch release mechanism can be prevented or reduced, the distance between the intermediate shaft and the transmission output shaft can be shortened, and the engine case can be miniaturized.

In addition, the balancer weight for engine vibration damping is disposed on the intermediate shaft so as to rotate integrally with the intermediate shaft. Therefore, the shaft on which the clutch unit is mounted can be constituted as a common shaft for the balancer shaft, which can contribute to a reduction in the number of shafts rotatably supported in the engine case, thus making compact the engine case.

The engine case has a dividable structure composed of upper and lower sections, and the four shafts of the crankshaft, the intermediate shaft, the transmission input shaft, and the transmission output shaft are arranged on the mating surface of the upper and lower case sections. Accordingly, the number of divisions of the engine case can be minimized, while at the same time, the stiffness of the engine case can be enhanced and the noise caused by the engagement of gears can be further reduced.

The nature and further characteristic features of the motorcycle engine of the present invention will be made clearer from the following descriptions made with reference to the accompanying drawings.

DESCRIPTION OF THE PREFERRED EMBODIMENTS

A preferred embodiment of the present invention will be described hereunder with reference to the accompanying drawings. Further, it is to be noted that terms "upper", "lower", "right", "left" and the like terms are used herein with reference to the illustration of the drawings or in a general standing state of a motorcycle.

Figure 1:
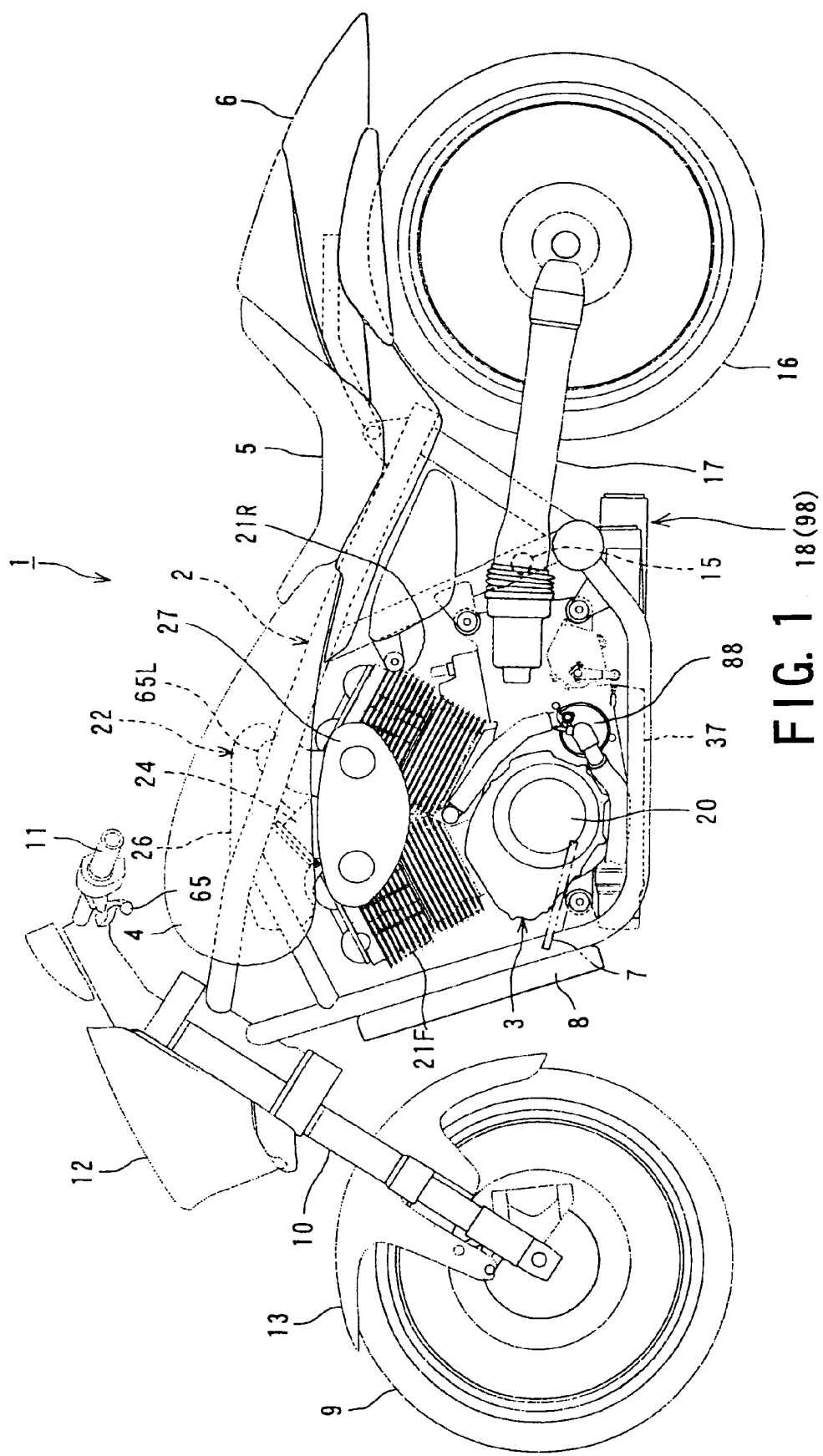
FIG. 1 is a left side view of an example of a motorcycle mounted with an engine according to one embodiment of the present invention.

With reference to FIG. 1 being a left-side view of a motorcycle 1, the motorcycle 1 includes a double-cradle body frame 2 formed mainly from a steel pipe. A V-twin engine 3 which has front and rear cylinders is incorporated in a front area in the body frame 2 (i.e., double-cradle part). A fuel tank 4 is disposed on the body frame 2 above the V-engine 3. A seat 5 and a rear cowling 6 are disposed in order behind the fuel tank 4. A pair of left and right steps 7 are disposed adjacent to the lower front portion of the V-engine 3. A radiator 8 is disposed in the front portion of the body frame 2.

A front fork 10 supporting a front wheel 9 is supported at the front area of the body frame 2 together with a handle bar 11, a front cowling 12 and a front fender 13 so as to be freely pivotal in the lateral direction. A swing arm 17 supporting a rear wheel 16 is supported by a pivot shaft 15 laterally hanging in the central lower portion of the body frame 2 so as to be swingable in the vertical direction. A rear-wheel suspension 18 is disposed adjacent to the base of the swing arm 17.

Figure 2:
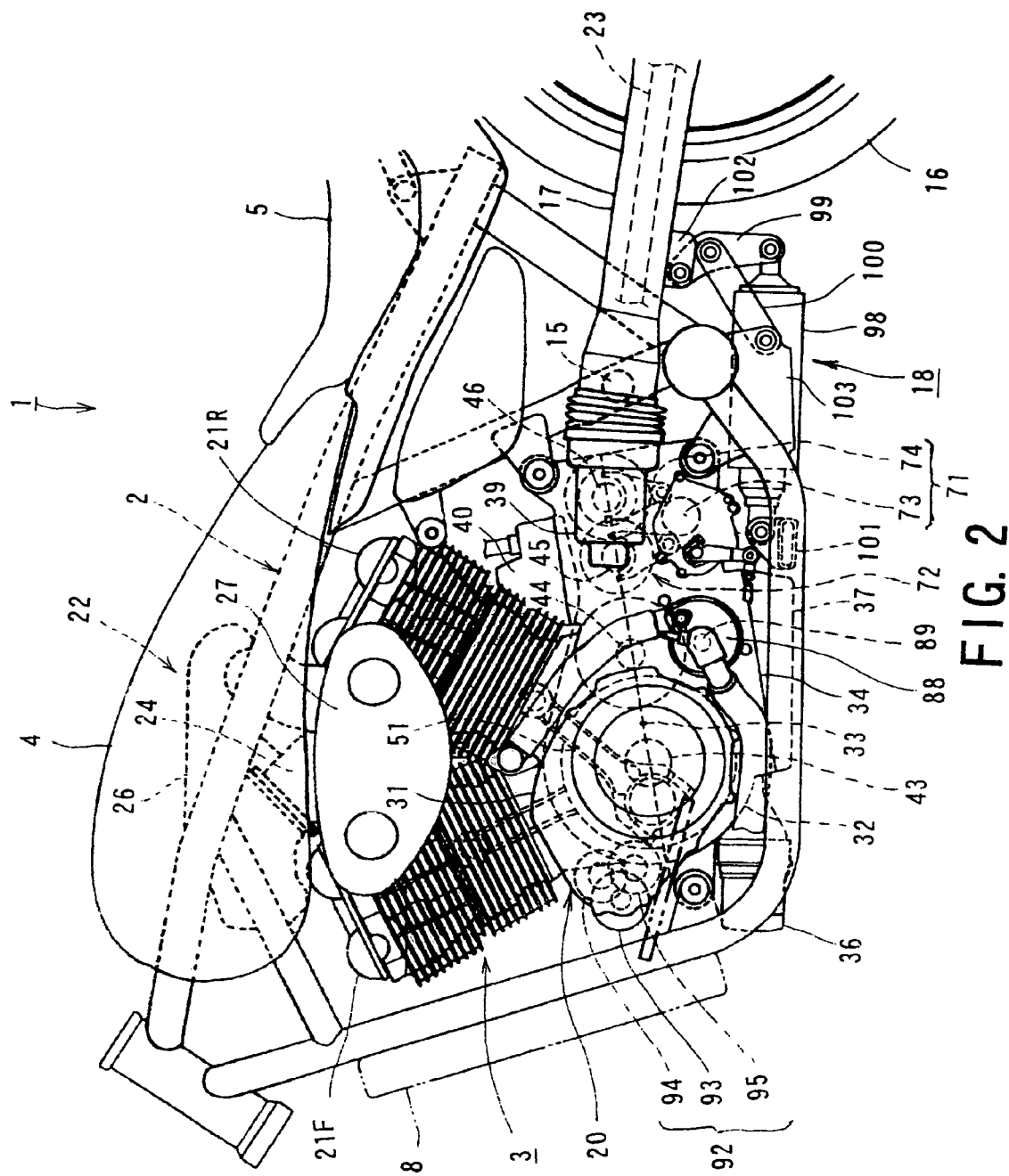
FIG. 2 is a left side view of the engine.

As illustrated in FIG. 2, the V-engine 3 includes two cylinders inclining in the longitudinal direction of the motorcycle (front cylinder 21F and rear cylinder 21R) disposed above an engine case 20. The V-bank angle between the cylinders 21F and 21R is set at a narrow angle, for example, about 55°. An intake device 22 is disposed above the cylinders 21F and 21R. The output of the V-engine 3 can be transmitted to the rear wheel 16 via, for example, a drive shaft 23 passing through the inside of the swing arm 17.

The intake device 22 includes a single center air cleaner 26, two (left and right) side air cleaners 27, and two throttle bodies 24 individually connected to intake ports opened in opposing surfaces of the front cylinder 21F and the rear cylinder 21R. The center air cleaner 26 is disposed above a V-bank defined between the front cylinder 21F and the rear cylinder 21R and in a recess formed in the bottom of the fuel tank 4. The side air cleaners 27 are disposed on left and right sides of the V-bank.

The engine case 20 of the V-engine 3 has a structure dividable into upper and lower sections in which an upper case half 31 and a lower case half 32 are joined at a mating surface 33. In a side view of the motorcycle, the mating surface 33 and a lower case surface 34 are substantially parallel to each other and are inclined downwardly from rear to front. The engine case 20 is provided with an oil filter 36 at a front lower portion, with an oil pan 37 on the lower case surface 34, with a bevel gear housing 39 at a left-side rear portion, and with a breather case 40 on the upper rear surface.

Figure 3:
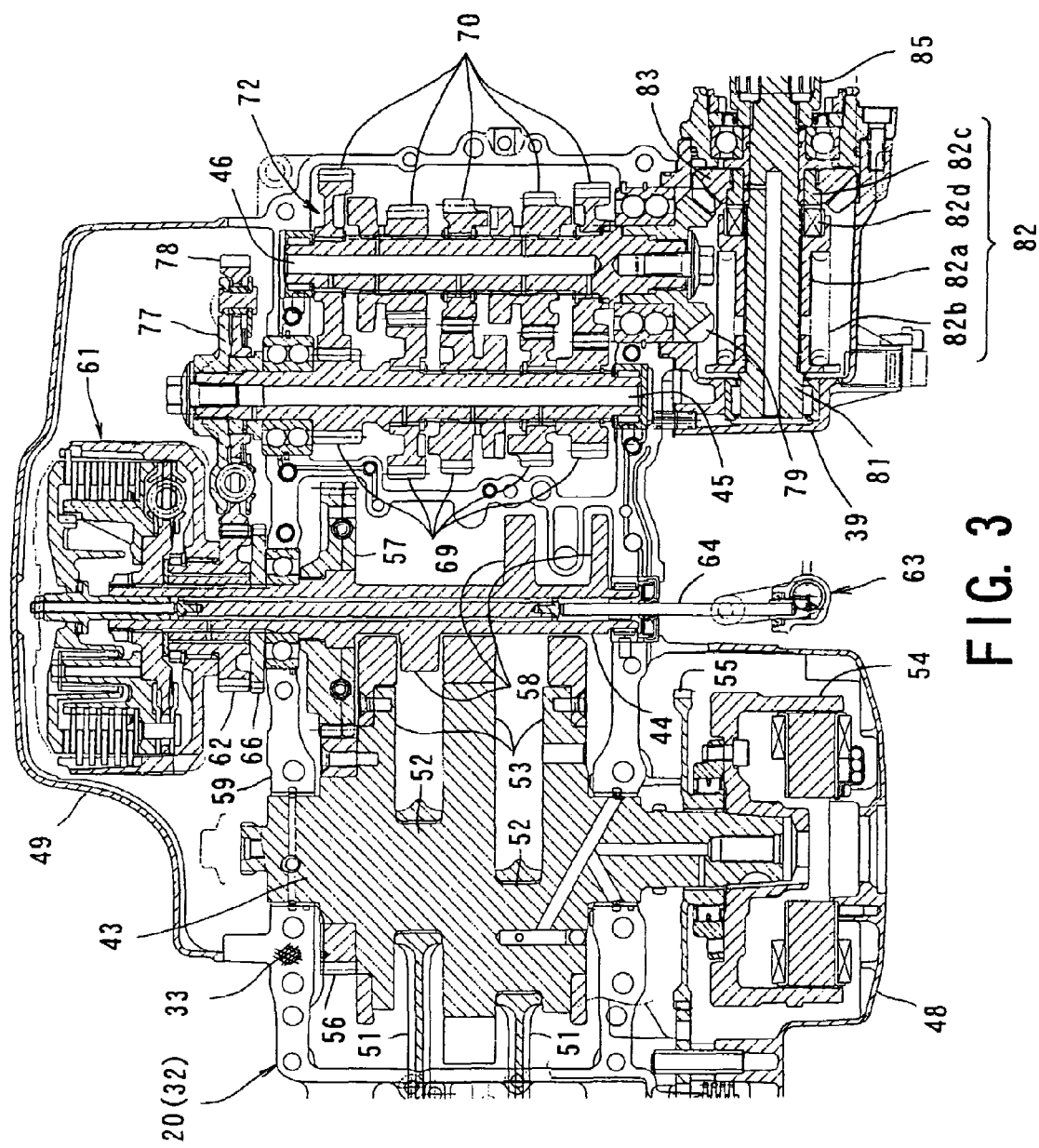
FIG. 3 is a plan view of a lower case half along a mating surface of an engine case.

FIG. 3 is a plan view of the lower case half 32 along the mating surface 33. At the mating surface 33, a laterally extending crankshaft 43 is rotatably supported at the most front portion, and an intermediate shaft 44, a transmission input shaft 45, and a transmission output shaft 46 are sequentially disposed substantially in parallel to each other behind the crankshaft 43. The rotating shafts 43, 44, 45, and 46 are rotatably supported so as to be aligned with each other as viewed from a side of the motorcycle. A magneto cover 48 is coated onto the left side of the engine case 20, and a clutch cover 49 is coated onto the right side of the engine case 20.

At the intermediate portion of the crankshaft 43, a crank pin 52 connected to two connecting rods 51 and a crank arm 53 are integrally formed. A flywheel magneto 54 and a starter driven gear 55 are mounted on the left end of the crankshaft 43. A primary drive gear 56 is mounted on the right end of the crankshaft 43. The primary drive gear 56 is meshed with a primary driven gear 57 mounted on the intermediate shaft 44 and having teeth of the same number as those of the primary drive gear 56. This enables the intermediate shaft 44 to be rotated by the crankshaft 43 at the same speed via the primary drive gear 56 and the primary driven gear 57.

The intermediate shaft 44 is provided with three balancer weights 58 for damping an engine vibration so that the balancer weights 58 rotate integrally with the intermediate shaft 44. The balancer weights 58 serve to cancel vibration of the V-engine 3. The primary driven gear 57 may be formed as a double scissors gear to reduce noise caused by the engagement of gears.

The right end of the intermediate shaft 44 protrudes outward through a sidewall 59 constituting a right side of the engine case 20. A multi-plate clutch unit 61 is disposed on the protruding end of the intermediate shaft 44. A secondary drive gear 62 is disposed between the clutch unit 61 and the sidewall 59. The primary driven gear 57 and the primary drive gear 56 are situated opposite to the secondary drive gear 62 with the sidewall 59 disposed therebetween, that is, they are situated to the left of the sidewall 59.

A clutch release mechanism 63 is disposed on the intermediate shaft 44 remote from the clutch unit 61 (i.e., to the left) and in front of the bevel gear housing 39. The intermediate shaft 44 is a hollow shaft in which a clutch release rod 64 is incorporated. The secondary drive gear 62 usually rotates integrally with the intermediate shaft 44. However, when a clutch lever 65 disposed on the handle bar 11 of the motorcycle 1 is gripped, the clutch release mechanism 63 presses the clutch release rod 64, the clutch engagement of the clutch unit 61 is released, and the secondary drive gear 62 becomes rotatable around the intermediate shaft 44. A rotation auxiliary drive gear 66 is disposed adjacent and to the left side of the secondary drive gear 62. The rotation auxiliary drive gear 66 is connected to the intermediate shaft 44 to be always rotatable integrally with the intermediate shaft 44.

A transmission device 72 is composed of: the transmission input shaft 45 and the transmission output shaft 46, which are rotatably supported at the rear part of the mating surface 33; transmission drive gears 69 and transmission driven gears 70, both of which may be, for example, 5-speed transmission gears; and a gear change operation mechanism 71 (see FIG. 2) which is disposed below the transmission input shaft 45 and the transmission output shaft 46.

The gear change operation mechanism 71 includes a shift drum 73 and a plurality of shift forks 74.

A secondary driven gear 78 provided with a shock absorbing damper 77 is mounted on the right end of the transmission input shaft 45, and the secondary driven gear 78 is meshed with the secondary drive gear 62 mounted on the intermediate shaft 44. The number of teeth of the secondary driven gear 78 is larger than that of the secondary drive gear 62. Therefore, the transmission input shaft 45 is rotated by the intermediate shaft 44 at a reduced speed via the secondary drive gear 62 and the secondary driven gear 78. The transmission output shaft 46 is rotated by the transmission input shaft 45 at a changed speed via any combination of the transmission drive gears 69 and the transmission driven gears 70.

The bevel gear housing 39 is disposed on the side of the engine case 20 (in this case, left side) opposite to the side adjacent to the clutch unit 61 and behind the intermediate shaft 44. A drive bevel gear 79 is disposed on the left end of the transmission output shaft 46. A final output shaft 81 extending longitudinally is rotatably supported in the bevel gear housing 39. A driven bevel gear 83 is mounted on the final output shaft 81 through a cam damper mechanism 82 and meshed with the drive bevel gear 79.

The cam damper mechanism 82 is positioned in front of the driven bevel gear 83, which is disposed on the final output shaft 81 so as to rotate freely. In the cam damper mechanism 82, a driven torque cam 82a is meshed with a drive torque cam 82c via a swashplate cam 82d by means of biasing force of a spring 82b. The driven torque cam 82a is disposed on the final output shaft 81 so as to rotate integrally with the final output shaft 81 and to be freely slidable in the axial direction.

When an overtorque occurs between the final output shaft 81 and the driven bevel gear 83, the driven torque cam 82a is separated from the drive torque cam 82c against the biasing force of the spring 82b due to thrust force of the swashplate cam 82d, so that the overtorque is absorbed. The gear ratio between the drive bevel gear 79 and the driven bevel gear 83 can be 1:1, for example.

The final output shaft 81 is connected to the drive shaft 23 via a universal joint 85 so that the final output shaft 81 rotates integrally with the drive shaft 23. Therefore, the rotation of the crankshaft 43 is transmitted to the intermediate shaft 44, the rotation of the intermediate shaft 44 is transmitted to the clutch unit 61, the rotation of the clutch unit 61 is transmitted to the transmission input shaft 45, the rotation of the transmission input shaft 45 is transmitted to the transmission output shaft 46, the rotation of the transmission output shaft 46 is transmitted to the final output shaft 81, the rotation of the final output shaft 81 is transmitted to the drive shaft 23, and then the rotation of the drive shaft 23 is transmitted to the rear wheel 16. During the gear changing operation of the transmission device 72, the clutch unit 61 interrupts the transmission of the rotation of the intermediate shaft 44 to the transmission input shaft 45 to smoothly perform the gear change operation.

As illustrated in FIG. 2, auxiliaries (auxiliary equipments) for rotation, such as a water pump 88 and an oil pump, are disposed in front of the gear change operation mechanism 71 and below the mating surface 33 of the engine case 20. In this embodiment, the water pump 88 is disposed on the left side of the engine case 20, and the oil pump, not shown, is disposed in a lower portion inside the engine case 20. The rotation auxiliaries are mounted on a single auxiliary drive shaft 89 rotatably supported below the intermediate shaft 44. The auxiliary drive shaft 89 is provided with a rotation auxiliary driven gear, not shown, and the rotation auxiliary driven gear is meshed with the rotation auxiliary drive gear 66 on the intermediate shaft 44.

An engine starter device 92 is disposed in front of the crankshaft 43 and above the mating surface 33 of the engine case 20. The engine starter device 92 includes a starter motor 93, a starter idle gear 94, and a starter drive gear 95. The starter drive gear 95 is meshed with the starter driven gear 55 on the crankshaft 43.

The rear-wheel suspension 18 includes an extendable rear cushion unit 98 and two types of links 99 and 100. The rear cushion unit 98 is extendable along the longitudinal direction of the motorcycle body. In the side view of the motorcycle, the rear cushion unit 98 is disposed at a position lower than the swing arm 17 and is positioned substantially beneath the pivot shaft 15.

As described above, for the engine case 20 of the V-engine 3, the mating surface 33, at which the upper case half 31 is in contact with the lower case half 32, and the lower case surface 34 are substantially parallel to each other and are inclined downwardly from rear to front, and the lower rear portion of the engine case 20 is raised. The rear cushion unit 98 is disposed so that the front portion thereof is inserted into a space under the raised portion. Below the rear portion of the engine case 20, the front end of the rear cushion unit 98 is connected to a bridge member 101 extending laterally on the lower portion of the body frame 2.

The top end of the link 99 is connected to a link blanket 102 disposed on an intermediate portion of the swing arm 17 so that the link 99 can freely swing. The bottom end of the link 99 is connected to the rear end of the rear cushion unit 98. One end of the link 100 is connected to a link plate 103 disposed on the lower portion of the body frame 2 so that the link 100 can freely swing. The other end of the link 100 is connected to an intermediate portion of the link 99 so that the link 100 can freely swing. Therefore, when the swing arm 17 is swung upward, the link 100 causes the link 99 to swing clockwise (in FIG. 2), and the rear cushion unit 98 is compressed by means of the link 99.

As described above, the front portion of the rear cushion unit 98 is disposed below the rear portion of the engine case 20. Therefore, the rear wheel 16 can be brought near to the V-engine 3 without raising the position of mounting the whole structure of the V-engine 3 and the position of the center of gravity of the body, the distortion of the swing arm 17 can be prevented or reduced by shortening the swing arm 17, and the running stability of the motorcycle can be improved.

The oil pan 37, which protrudes downward from the lower case surface 34 of the engine case 20, has a length enough to cover a portion below the crankshaft 43 through a portion below the intermediate shaft 44. The bridge member 101, to which the front end of the rear cushion unit 98 is attached, is disposed behind the rear end wall of the oil pan 37. In the side view of the motorcycle, the bottom of each of the oil filter 36, the oil pan 37, and the rear cushion unit 98 is positioned above the lowermost portion of the body frame 2.

For the V-engine 3 of the motorcycle 1, the clutch unit 61 is mounted on the intermediate shaft 44 supported behind the crankshaft 43, and the rotation of the crankshaft 43 is transmitted to the clutch unit 61 at the same speed. Compared with a conventional engine in which the rotation of a crankshaft is transmitted to a clutch unit at a reduced speed, the shaft torque acting on the clutch unit 61 can be significantly reduced. Therefore, the capacity of the clutch unit 61 can be reduced, and the outer diameter and width dimension of the clutch unit 61 can be reduced. Thus, the clutch actuation force can be reduced, and the engine case 20 can be miniaturized.

Since the transmission input shaft 45 is rotated by the intermediate shaft 44 at the reduced speed, the gear ratio (i.e., difference in the outer diameter) between the transmission drive gear 69 on the transmission input shaft 45 and the transmission driven gear 70 on the transmission output shaft 46 can be reduced, and the distance between the transmission input shaft 45 and the transmission output shaft 46 can be reduced. This can contribute to miniaturization of the engine case 20.

Furthermore, since the primary drive gear 56 and the primary driven gear 57 are disposed inside the sidewall 59 of the engine case 20, the propagation of noise caused through the engagement of gears to the outside of the engine case 20 can be prevented or reduced by covering the gears 56 and 57, which generate large noise because they are primary gears, with two members of the sidewall 59 and the clutch cover 49. Therefore, quietness of the V-engine 3 can be significantly improved. Further, the use of a scissors gear as the primary driven gear 57 contributes greatly to a reduction in the noise caused by the engagement of gears.

In addition, since the bevel gear housing 39 is disposed so as to oppose to the clutch unit 61, the distances between the rotating shafts 43, 44, 45, and 46 in the engine case 20 can be reduced, and the longitudinal dimensions of the engine case 20 can be hence reduced. At the same time, the heavy bevel gear housing 39 and the heave clutch unit 61 can be arranged so as to be divided in both sides in the engine case 20, thus allowing substantially even lateral weight distribution of the V-engine 3.

The bevel gear housing 39 is disposed behind the intermediate shaft 44, and the clutch release mechanism 63 is disposed on the intermediate shaft 44 remote from the clutch unit 61 and in front of the bevel gear housing 39. Accordingly, the interference between the bevel gear housing 39 and the clutch release mechanism 63 can be prevented or reduced, the distance between the intermediate shaft 44 and the transmission output shaft 46 can be shortened, and the engine case 20 can be miniaturized.

Still furthermore, the balancer weights 58 for damping the engine vibration are disposed on the intermediate shaft 44 so as to be rotated integrally therewith. Therefore, the shaft on which the clutch unit 61 is mounted can be constructed commonly as the balancer shaft, which can contribute to the reduction in the number of shafts rotatably supported in the engine case 20 and miniaturization of the engine case 20.

The engine case 20 has a dividable structure into upper and lower sections, and the four shafts of the crankshaft 43, the intermediate shaft 44, the transmission input shaft 45 and the transmission output shaft 46 are arranged on the mating surface 33. Therefore, the number of divisions of the engine case 20 can be minimized while, at the same time, the stiffness of the engine case 20 can be improved and the noise caused by the engagement of gears can be further reduced.

The V-twin engine in the described embodiment can be replaced with any engine as long as a shaft rotatably supported in an engine case extends laterally. A wide range of engines can be applied, irrespective of the number of cylinders and the configuration of cylinders.

It is to be noted that the present invention is not limited to the described embodiment mentioned above and many other changes and modifications may be made without departing from the scopes of the appended claims.

What is claimed is:

1. An engine for a motorcycle, comprising:
   an engine case;
   a crankshaft rotatably supported in the engine case and extending in a width direction therein;
   an intermediate shaft disposed in substantially parallel to the crankshaft so as to be rotated by the crankshaft at a same speed as that of the crankshaft via a primary drive gear and a primary driven gear;
   a transmission input shaft disposed in substantially parallel to the intermediate shaft so as to be rotated by the intermediate shaft at a reduced speed via a secondary drive gear and a secondary driven gear;
   a transmission output shaft disposed in substantially parallel to the transmission input shaft so as to be rotated by the transmission input shaft at a changed speed via any combination of a plurality of transmission drive gears and transmission driven gears;
   a clutch unit mounted on the intermediate shaft for transmitting and interrupting rotation of the intermediate shaft to the transmission input shaft, and a balancer weight for damping engine vibration mounted on the intermediate shaft so as to be rotated integrally with the intermediate shaft.

2. The motorcycle engine according to claim 1, wherein the intermediate shaft has one end portion protruding outward through a sidewall of the engine case, the clutch unit is disposed on the protruding end of the intermediate shaft, the secondary drive gear is mounted on the intermediate shaft between the clutch unit and the sidewall of the engine case, the primary driven gear is positioned so as to oppose to the secondary drive gear with the side wall of the engine case disposed therebetween, and the primary driven gear is meshed with the primary drive gear on the crankshaft.

3. The motorcycle engine according to claim 1, wherein the primary driven gear is a scissors gear.

4. The motorcycle engine according to claim 1, wherein the engine case has a structure dividable into upper and lower sections, and four shafts of the crankshaft, the intermediate shaft, the transmission input shaft, and the transmission output shaft are rotatably supported at a mating surface of the engine case so that the four shafts are aligned on a straight line as seen in a side view of the motorcycle.

5. The motorcycle engine according to claim 1, further comprising a bevel gear housing disposed on a side of the engine case opposite to a side adjacent to the clutch unit, wherein a longitudinally extending final output shaft is incorporated in the bevel gear housing so as to be rotatably supported therein, and a drive bevel gear mounted on an end portion of the transmission output shaft is meshed with a driven bevel gear mounted on the final output shaft inside the bevel gear housing.

6. The motorcycle engine according to claim 5, further comprising a clutch release mechanism mounted on the intermediate shaft remote from the clutch unit, a flywheel magneto mounted on an end portion of the crankshaft opposite to a side adjacent to the clutch unit, and a damper mechanism mounted on the final output shaft and in front of the driven bevel gear, wherein the flywheel magneto is covered with a magneto cover, the damper mechanism is covered with the bevel gear housing, and the clutch release mechanism is disposed between the magneto cover and the bevel gear housing.

7. The motorcycle engine according to claim 6, wherein the intermediate shaft has a hollow structure in which a clutch release rod for the clutch release mechanism is inserted.

* * * * *